US012689601B2

(12) United States Patent
Darmour et al.

(10) Patent No.: US 12,689,601 B2
(45) Date of Patent: Jul. 21, 2026

(54) TOPIC-BASED SYNCHRONIZATION OF A CHAT INTERFACE WITH AN INFORMATION INTERFACE

(71) Applicant: Oracle International Corporation, Redwood Shores, CA (US)

(72) Inventors: Jennifer Darmour, Seattle, WA (US); Orry Soegiono, Bellevue, WA (US); Micah Lawler Sonderman, San Antonio, TX (US); Salman Saleem Sheikh, Sanford, FL (US)

(73) Assignee: Oracle International Corporation, Redwood Shores, CA (US)

(*) Notice: Subject to any disclaimer, the term of this patent is extended or adjusted under 35 U.S.C. 154(b) by 71 days.

(21) Appl. No.: 18/922,859

(22) Filed: Oct. 22, 2024

(65) Prior Publication Data

US 2026/0075012 A1 Mar. 12, 2026

Related U.S. Application Data

(60) Provisional application No. 63/691,492, filed on Sep. 6, 2024.

(51) Int. Cl.
| | |
|---|---|
| *H04L 51/04* | (2022.01) |
| *H04L 51/02* | (2022.01) |
| *H04L 51/216* | (2022.01) |

(52) U.S. Cl.
CPC .............. *H04L 51/04* (2013.01); *H04L 51/02* (2013.01); *H04L 51/216* (2022.05)

(58) Field of Classification Search
CPC ........ H04L 51/04; H04L 51/216; H04L 51/02

USPC .......................................................... 709/206
See application file for complete search history.

(56) References Cited

U.S. PATENT DOCUMENTS

| | | | | |
|---|---|---|---|---|
| 2012/0284093 | A1* | 11/2012 | Evans | G06Q 30/0251 705/14.1 |
| 2013/0132284 | A1* | 5/2013 | Convertino | G06Q 10/103 705/300 |
| 2014/0181652 | A1* | 6/2014 | Stanke | G06F 9/453 715/708 |
| 2014/0195517 | A1* | 7/2014 | Buchheit | H04L 51/216 707/722 |
| 2018/0367484 | A1* | 12/2018 | Rodriguez | H04L 67/75 |
| 2018/0373415 | A1* | 12/2018 | Dellinger | G06F 3/0486 |
| 2020/0160985 | A1* | 5/2020 | Kusuma | G16H 30/40 |
| 2024/0039748 | A1* | 2/2024 | Yang | H04L 12/1822 |
| 2025/0028688 | A1* | 1/2025 | Chang | G06Q 10/107 |
| 2025/0373461 | A1* | 12/2025 | Ryan | G06Q 10/103 |

* cited by examiner

*Primary Examiner* — Ruolei Zong
(74) *Attorney, Agent, or Firm* — Invoke

(57) ABSTRACT

Techniques for synchronizing the topic of messages in a chat interface with content in an information pane include concurrently displaying a chat interface and an information pane in a GUI and monitoring the content currently displayed within the information pane to determine a set of one or more topics. The system identifies and displays a subset of stored chat messages associated with the set of topics concurrently with the content. When the system detects that the content in the information pane is changed to different content, the system determines a second set of one or more topics corresponding to the changed content and identifies a second subset of the stored chat messages based on the second set of topics. The second subset is displayed in the chat interface concurrently with the second set of content.

20 Claims, 8 Drawing Sheets

100

Message
110

Application
120

Graphical User Interface
122

Chat Interface 123

Information Pane 125

Topic Synchronizer
126

NLP Model
128

Data Repository
130

Content Records
132

Stored Chat Message(s)
134

Mapping(s)
136

Application Data
138

600

TOPIC-BASED SYNCHRONIZATION OF A CHAT INTERFACE WITH AN INFORMATION INTERFACE

BENEFIT CLAIMS; RELATED APPLICATIONS; INCORPORATION BY REFERENCE

This application claims the benefit of U.S. Provisional Patent Application 63/691,492, filed Sep. 6, 2024, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to synchronizing the topic of messages in a chat interface with an information pane based on the content in the information pane. In particular, the present disclosure relates to using one or more topics present in the content in the information pane to identify and display a subset of historical chat messages associated with the one or more topics concurrently with the content in the information pane.

BACKGROUND

Users of an application that provides a chat interface for users to communicate with each other and to interact with the application may wish to review previous chat conversations. A user may be viewing information about a topic or working on a document or data record and may wish to recall information from a previous chat conversation about the topic. If previous chat conversations are available and searchable, the user may have trouble locating the chat messages that are relevant to the information the user is currently interacting with.

The approaches described in this section are approaches that could be pursued, but not necessarily approaches that have been previously conceived or pursued. Therefore, unless otherwise indicated, one should not assume that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and they mean at least one. In the drawings.

DETAILED DESCRIPTION

Figure 1:
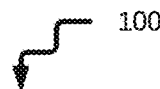
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CONTENT SYNCHRONIZATION ARCHITECTURE
3. TOPIC-BASED SYNCHRONIZATION
4. EXAMPLE EMBODIMENTS
   a. Individualized Synchronization
   b. User and Chatbot Messages
   c. Multiple Concurrent Chat Windows
   d. Synchronizing Current and Historical Chat Messages
5. PRACTICAL APPLICATIONS, ADVANTAGES, AND IMPROVEMENTS
6. COMPUTER NETWORKS AND CLOUD NETWORKS
7. HARDWARE OVERVIEW
8. MISCELLANEOUS; EXTENSIONS

1. General Overview

One or more embodiments continuously or periodically update a chat interface to display subsets of historical chat messages that correspond to content currently detected in an information pane. The subsets of historical chat messages may be displayed concurrently with recent chat messages within a same chat interface. The historical chat messages may correspond to conversations between a user and a chatbot or a user and other users. The system may identify the historical chat messages, to select subsets of the historical chat messages, based on the historical chat messages corresponding to a same set of participants as a current chat conversation associated with the chat interface.

Different chat interfaces corresponding to a same chat conversation may display different subsets of the historical chat messages based on the information panes respectively associated with the chat interfaces.

One or more embodiments concurrently display a chat interface and an information pane in a graphical user interface (GUI) of an application. The system monitors a first set of content currently displayed within the information pane to determine a first set of one or more topics corresponding to the first set of content. The system executes a query on a set of stored chat messages to identify a first subset of the stored chat messages associated with the first set of one or more topics. The system concurrently displays the first subset of stored chat messages in the chat interface with the first set of content. When the system detects that the first set of content has been changed to a second set of content in the information pane, the system determines a second set of one or more topics corresponding to the second set of content. The system executes a second query on the set of stored chat messages to identify a second subset of the stored chat messages associated with the second set of one or more topics and displays the second subset of the stored chat messages in the chat interface concurrently with the second set of content.

One or more embodiments continuously or periodically update a chat interface to display subsets of historical chat messages that are related to recent chat messages. The subsets of historical chat messages may be displayed concurrently with recent chat messages within a same chat interface. The historical chat messages may correspond to conversations between a user and a chatbot or a user and other users. The system may identify the historical chat messages, to select subsets of the historical chat messages, based on the historical chat messages corresponding to a same set of participants as a current chat conversation associated with the chat interface. The system monitors recent chat messages (e.g., within the last n minutes) to determine a first set of one or more topics corresponding to the recent chat messages. The system executes a query on a set of stored chat messages to identify a first subset of the stored chat messages associated with the first set of one or more topics. The system concurrently displays the first subset of stored chat messages in the chat interface with the recent chat messages.

One or more embodiments described in this Specification and/or recited in the claims may not be included in this General Overview section.

2. Content Synchronization Architecture

FIG. 1 illustrates a system 100 in accordance with one or more embodiments. As illustrated in FIG. 1, system 100 includes an application 120 and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the system 100 is implemented on one or more digital devices. The term "digital device" generally refers to any hardware device that includes a processor. A digital device may refer to a physical device executing an application or a virtual machine.

Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the application 120 refers to hardware and/or software configured to perform operations described herein for synchronizing a display of historical chat messages according to one or more topics currently displayed in a concurrently displayed information pane. The application 120 may be a business management application, such as a medical practice application, that allows users to interact with other users and with clients while viewing information accessible to the application. The application 120 may include one or more functional components, such as a graphical user interface (GUI) 122, a topic synchronizer 126, and a natural language processing (NLP) model 128. Examples of operations for synchronizing a display of historical chat messages according to one or more topics that are displayed in an information pane are described below with reference to FIG. 2.

The application 120 may be configured to receive a message 110 from a user of the application, a chatbot, or from an external user. The message 110 may be in a human-readable format, for example, text entered from a keyboard or from a speech-to-text conversion operation. The message 110 can be associated with the composer of the message, e.g., the user or chatbot that generates the message. The message 110 can be associated with one or more chat participants. The chat participants are the other one or more entities participating in a chat conversation with the message composer.

The application 120 may generate and display a variety of GUI components with GUI 122 to allow users to interact with the functions and information of the application. The GUI 122 refers to hardware and/or software configured to facilitate communications between a user and the application 120. GUI 122 renders user interface elements and receives input via user interface elements. Examples of user interface elements include checkboxes, radio buttons, drop-down lists, list boxes, buttons, toggles, text fields, date and time selectors, command lines, sliders, pages, and forms.

In an embodiment, different components of GUI 122 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, GUI 122 is specified in one or more other languages, such as Java, C, or C++.

GUI 122 includes a chat interface 123 and an information pane 125. GUI 122 displays the messages in a chat conversation in a chat window of the chat interface. A chat conversation includes messages, e.g., message 110, exchanged between a user and one or more other users, and/or messages exchanged between a user and the chatbot. The chat interface 123 may include, for example, a message display component and a message composition field. The chat interface 123 can include multiple chat windows, for example, if a user is having separate chat conversations with different other users or groups of users at the same time.

The information pane 125 is configured to display content, such as from electronic documents, web pages, databases, audio-visual media, and images. GUI 122 displays content records 132 in the information pane 125. A content record 132 includes information to be presented, for example, journal articles, online encyclopedias, user manuals, internal knowledge base articles, reports, emails, or any materials accessible through a private or public search engine. A content record 132 may include formatting information that is not presented in the information pane but instructs the GUI on how to display the information. A content record 132 may be tagged, mapped, or otherwise associated with a topic indicator.

A content record 132 can include a configuration of the information to be displayed in the information pane. The configuration can identify a first portion of a content record that can be used by the system when selecting subsets of the stored chat messages 134 and a second portion of the content record that is not to be used in selecting subsets of the stored chat messages. The first portion may include information relevant to the topic. The second portion may include, for example, formatting information, navigation links to other content, boilerplate information, or other data that is not relevant to the topic of the content record.

The topic synchronizer 126 identifies one or more topics in the content displayed in the information pane and presents a subset of historical chat messages related to the one or more topics. A topic can include a person, such as a client of a business or a patient of a medical practice. A topic can include a subject area, such as a particular medical condition, a data record, or a specific business transaction.

The combined presentation of information and related chat messages provides context for the information along with a focused reminder of previous conversations related to the information. The subset of historical chat messages can be accessed from stored chat messages 134. The system stores chat messages that were exchanged in chat conversations, for example, in a chat message database. The system stores data about a stored chat message. For example, the system can store information identifying the message composer, information identifying the other participant(s) in the chat conversation where the message was received, a timestamp when the message was sent by the composer, a timestamp of when the message was read by another participant, and one or more topics associated with the message. The system may store context information with a chat message, for example, a reference to a content record that was open when the chat message was received.

The topic synchronizer 126 may access application information to identify and synchronize the topics in an information pane and the chat messages in the chat interface. The topic synchronizer 126 may use the application information to narrow or otherwise refine a query to retrieve the stored chat messages 134 that are relevant to a topic in the information pane.

Application information can include mappings 136. Stored messages can be mapped to one or more topics. For example, a stored message can be mapped to the message sender as one topic, to a subject indicated by one or more words in the message, and to data records stored in association with the message sender.

Application information can include application data 138. Application data 138 can include information used by the application 120 as part of the functions the application performs. For example, the application data 138 can include calendar and scheduling information, personnel accounts, and application-specific reference information. For a medical practice application, the application data 138 can include patient records, information about medications, conditions addressed by the medications, available dosages for the medications, contraindications for the medications, and so forth.

In one or more embodiments, a data repository 130 is any type of storage unit and/or device (e.g., a file system, database, collection of tables, or any other storage mechanism) for storing data. Furthermore, a data repository 130 may include multiple different storage units and/or devices. The multiple different storage units and/or devices may or may not be of the same type or located at the same physical site. Furthermore, a data repository 130 may be implemented or executed on the same computing system as application 120. Additionally, or alternatively, a data repository 130 may be implemented or executed on a computing system separate from application 120. The data repository 130 may be communicatively coupled to application 120 via a direct connection or via a network.

Additional embodiments and/or examples relating to computer networks are described below in Section 6 titled "Computer Networks and Cloud Networks."

Information describing message content records 132, stored chat messages 134, mappings 136, and application data 138 may be implemented across any of components within the system 100. However, this information is illustrated within the data repository 130 for purposes of clarity and explanation.

3. Topic-Based Synchronization

Figure 2:
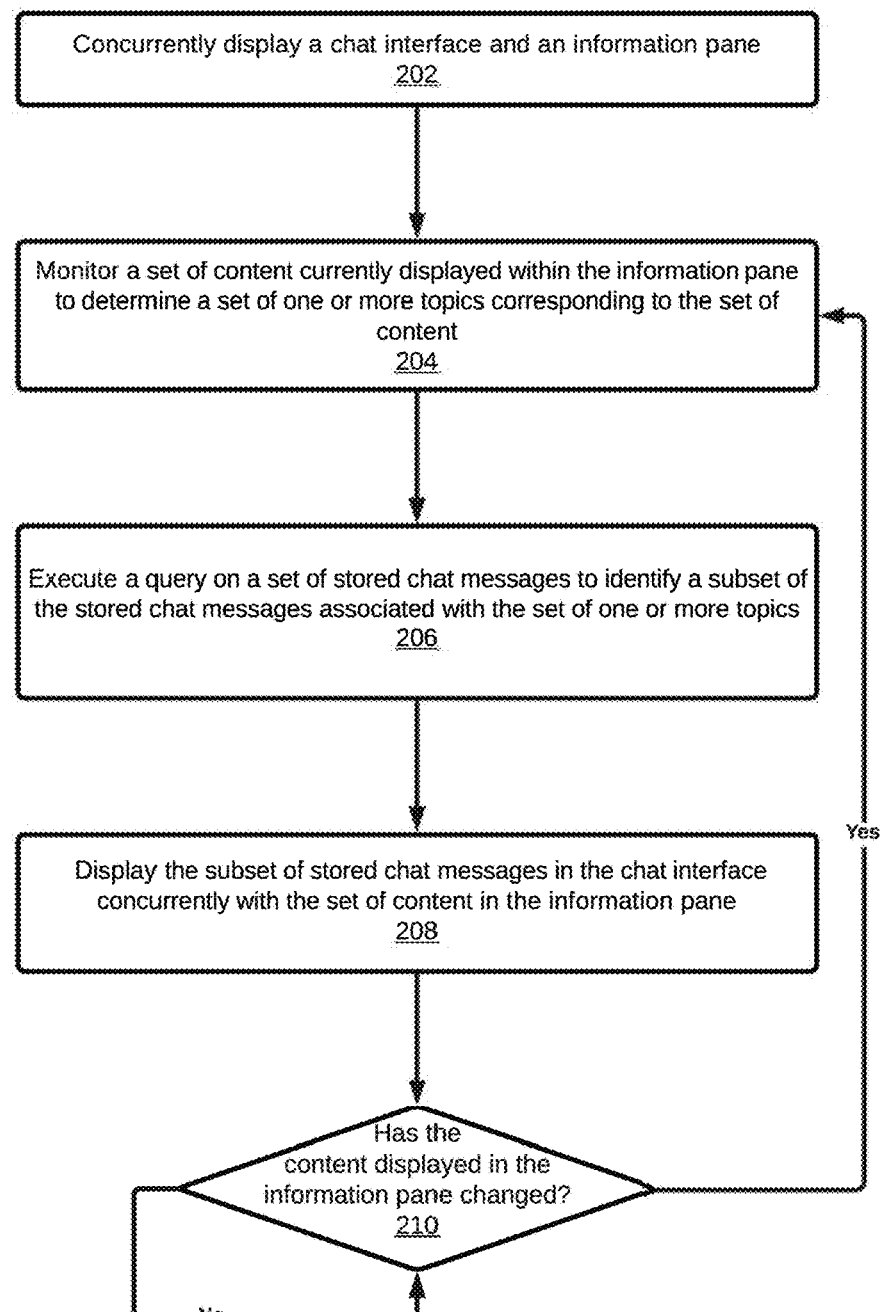
FIG. 2 illustrates an example set of operations for synchronizing chat messages and topics in an information pane in accordance with one or more embodiments.

FIG. 2 illustrates an example set of operations for synchronizing a display of historical chat messages according to one or more topics currently displayed in a concurrently displayed information pane in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the system concurrently displays a chat interface and an information pane in a GUI of an application (Operation 202). The system executes an instance of an application for a user and renders the GUI of the application on a display to the user. The GUI includes a chat interface where the user can communicate with other users and/or with a chatbot component of the application. The GUI includes an information pane where the application presents application-related information and/or other content records to the user. The system displays the chat interface and the information pane so that both are visible, e.g., side by side without overlapping.

In an embodiment, the system monitors a set of content currently displayed in the information pane to determine a set of one or more topics corresponding to the set of content (Operation 204). The system can access mapping information that maps one or more topics to the set of content. The system can access tags and/or metadata associated with the set of content that indicate one or more topics in the set of content. The system may apply a natural language processing model to text in the set of content to identify key content words or phrases that indicate the one or more topics.

In an embodiment, the system executes a query on a set of stored chat messages to identify a subset of the stored chat message associated with the set of one or more topics (Operation 206). The system composes a query based on the set of one or more topics determined from the content. The query can include, for example, keywords, account numbers, user identifiers, a date range, and/or a time range. The system retrieves a subset of stored chat messages that match one or more query terms. In some embodiments, the system may require that a retrieved stored chat message meet all query terms. Alternatively, the system may require that a retrieved stored chat message meet at least one query term or a percentage of query terms.

In an embodiment, the system identifies the set of participants communicating via the chat interface, e.g., the user viewing a particular instance of the application and chat interface and the one or more other entities receiving and responding to the user's messages in the same chat conversation. The system may select a subset of stored chat messages 134 from the stored chat messages involving the same set of participants communicating via the chat interface. That is, if users A, B, and C are participants in a chat conversation, the system may select the subset of stored chat messages from the historical chat messages associated with a previous conversation among users A, B, and C but not historical chat messages associated with a user D. Additionally, or alternatively, the system may select the subset of stored chat messages from the historical chat messages sent by any of users A, B, and C.

In an embodiment, the system displays the subset of stored chat messages in the chat interface concurrently with the set of content in the information pane (Operation 208). The system displays the messages in the subset of stored chat messages in a chat window in the chat interface in chronological order. If the number of messages in the subset, or the surface area needed to display the subset of messages, exceeds the display area of the chat window, the system may initially display the most recent messages in the subset and provide a scrolling mechanism, so the user can view earlier messages within the subset by scrolling.

In an embodiment, the system determines if the content displayed in the information pane has changed (Operation 210). The system may determine a change based on a user interaction with the application. For example, the system may determine that the user has selected a hyperlink to navigate to another page. The system may determine that the user has accessed a file system and opened a different document. The system may determine a change by comparing the contents of what is currently displayed in the information pane with the contents displayed previously at a time interval. The system may, for example, compute a hash value based on the displayed content and compare the hash value to a previously computed hash value. When the system determines that the content has changed, the system returns to operation 204.

In a medical practice management application, a doctor may be reviewing information about a particular patient in the information pane. The system may identify the one or more topics from the set of content in the information pane as including the particular patient, a particular aspect of the patient's health record, e.g., a list of prescriptions, a set of test results, a particular disease or condition, and/or a set of symptoms. The system may identify a subset of stored chat messages that include the doctor's past chat messages to a chatbot about the particular patient's health record, the doctor's past chat messages to other members of the medical staff about the patient, and the doctor's past chat messages to the particular patient. When the doctor navigates to view another patient's health records in the information pane, the system determines the change in content in the information panes and displays a different subset of historical stored chat messages in the chat interface that are relevant to the other patient and associated topics.

4. Example Embodiments

Several detailed examples are described below for purposes of clarity. Components and/or operations described below should be understood as one specific example that may not be applicable to certain embodiments. Accordingly, components and/or operations described below should not be construed as limiting the scope of any of the claims.

Figure 3:
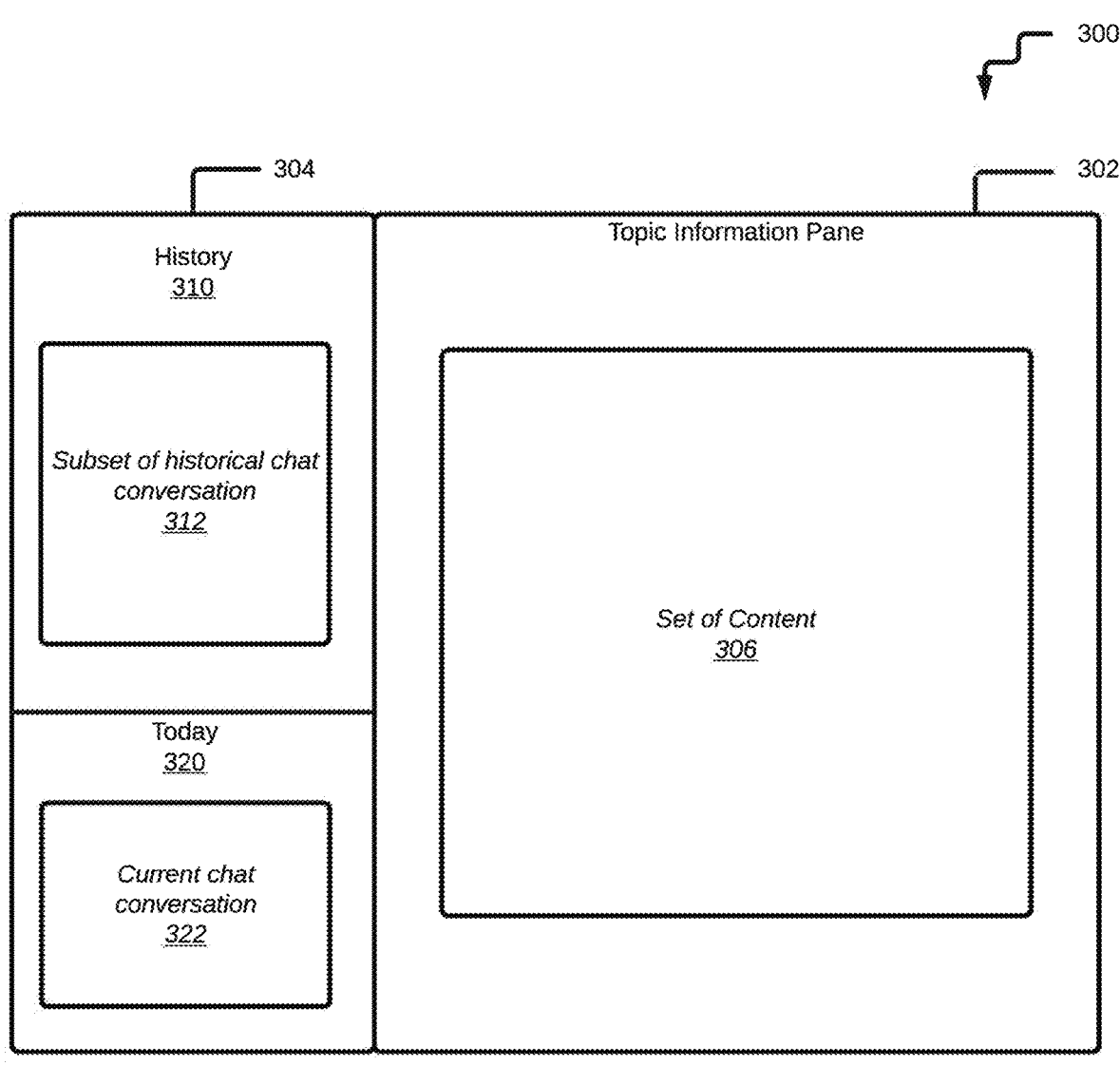
FIG. 3 illustrates an example of a graphical user interface in accordance with one or more embodiments.

FIG. 3 illustrates an example of a GUI 300 in accordance with one or more embodiments. GUI 300 includes an information pane 302 and a chat interface 304. The information pane 302 is presenting a set of content 306, for example, a part of an electronic medical record for a patient, an online encyclopedia entry, a web page, or a business document. The chat interface 304 includes a sub-pane 310 for displaying a subset of historical chat messages 312 related to the one or more topics of the set of content 306. The chat interface 304 includes a chat window 320 for displaying chat messages for a current chat conversation 322. The chat messages in the chat conversation 322 may include messages exchanged as part of the chat conversation 322 within a threshold period of time, including a current time. For example, the threshold of time can be within the past 2 hours, within the past 24 hours, or within the past 30 minutes. A chat message received as part of the current chat conversation 322 that was received outside of the threshold time may be stored as an historical chat message and may appear in the subset of chat messages 312 when the message is relevant to the one or more topics in the set of content 306.

a. Individualized Synchronization

In an embodiment, a first user (A) using a first instance of the application and a second user (B) using a second instance of the application are communicating via the chat interface of their respective application instances. The information pane for user A displays content to user A, and the information pane for user B displays different content to user B. The subset of messages displayed in the historical chat pane of the chat interface for user A are topically related to the user A's information pane content, and the subset of messages displayed in the historical chat pane of the chat interface for user B are topically related to the user B's information pane content.

Figure 4:
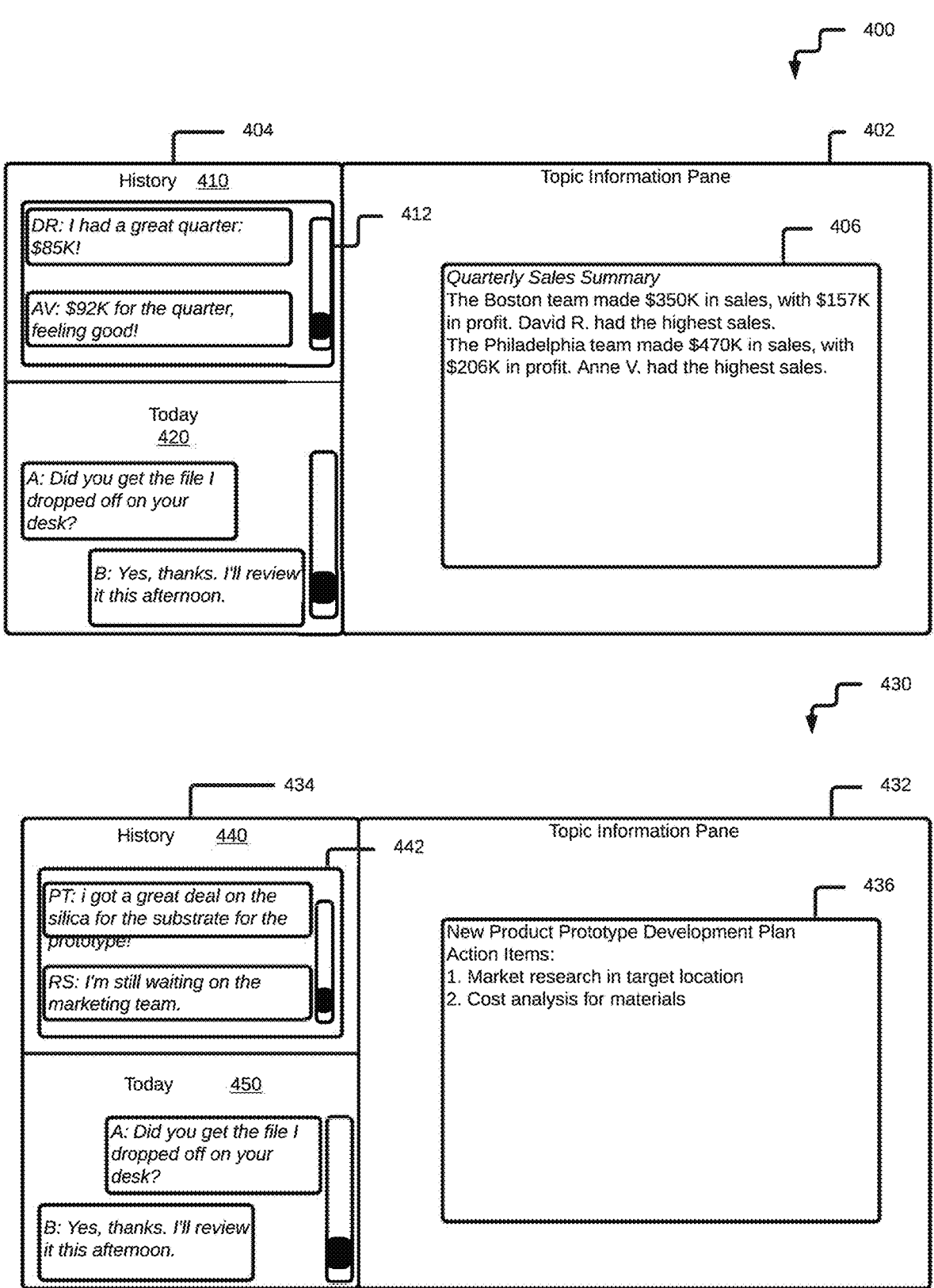
FIG. 4 illustrates an example of graphical user interfaces individually synchronized for two different users engaged in a current chat conversation.

FIG. 4 illustrates an example of graphical user interfaces individually synchronized for two different users engaged in a current chat conversation. User A sees GUI 400 while user B sees GUI 430. GUI 400 includes an information pane 402 and a chat interface 404. The information pane 402 is presenting a set of content 406, i.e., a quarterly sales summary. The chat interface 404 includes a sub-pane 410 for displaying a subset of historical chat messages 412. The chat interface 404 includes a chat window 420 for displaying chat messages for a current chat conversation between User A and User B. The subset of historical chat messages 412 is related to the topic of the quarterly sales summary and not necessarily to topics in the current chat conversation.

GUI 430 includes an information pane 432 and a chat interface 434. The information pane 432 is presenting a set of content 436, i.e., a new product development plan document. The chat interface 434 includes a sub-pane 440 for displaying a subset of historical chat messages 442. The chat interface 434 includes a chat window 450 for displaying chat messages for a current chat conversation between User A and User B. The subset of historical chat messages 442 is related to the topic of the new product development plan and not necessarily to topics in the current chat conversation.

b. User and Chatbot Messages

In an embodiment, the subset of the stored chat messages displayed in the chat interface corresponds to a user's chat conversation with a chatbot. The set of stored chat messages includes a historical set of queries by the user and responses by the chatbot. The displayed subset of stored chat messages can include the queries by the user and the responses by the chatbot. If the responses are in the form of a link or reference to other content, the link or reference may be selectable by the user to view the related content, for example, in the information pane, or in another interface pane or window.

Figure 5:
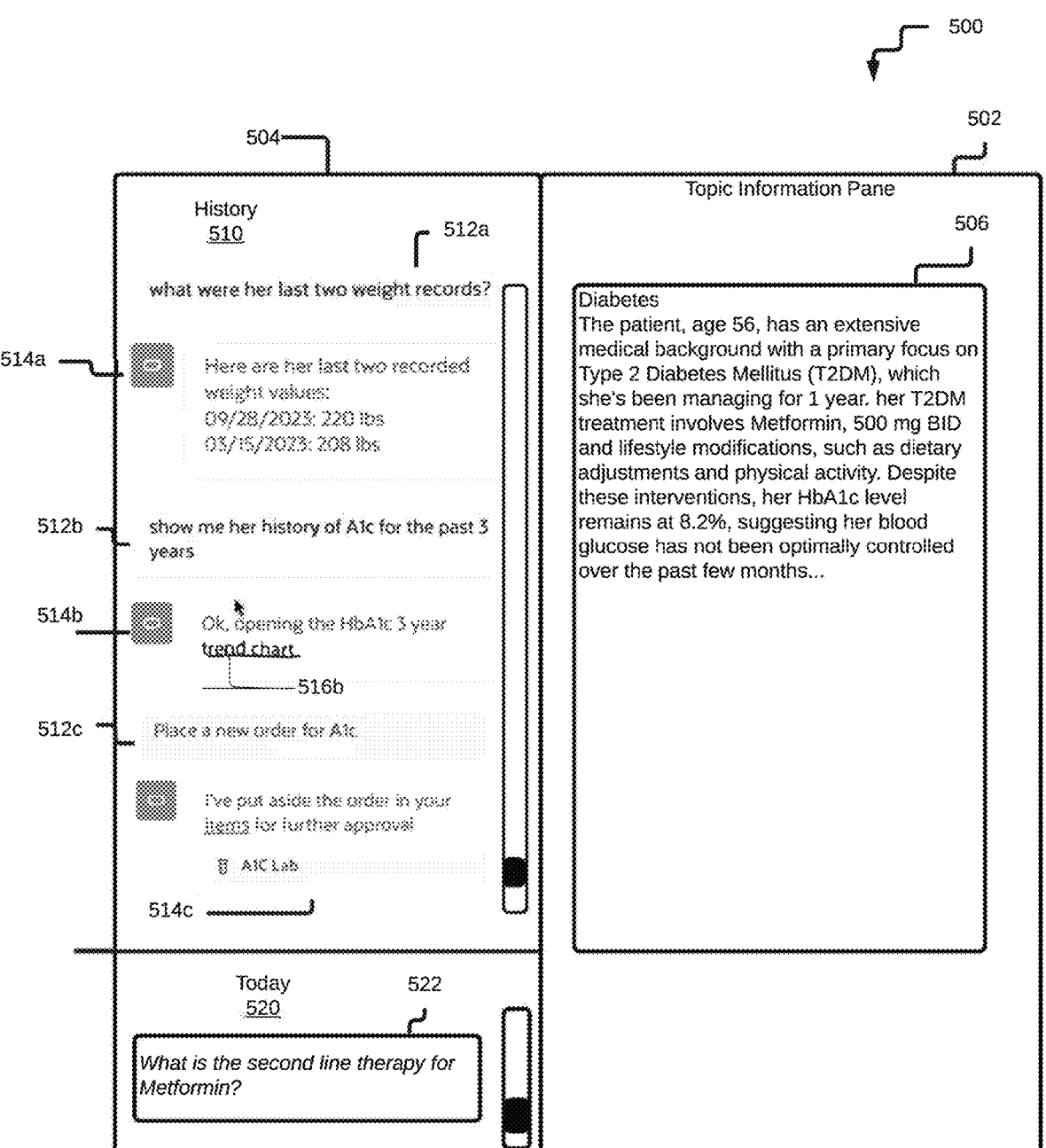
FIG. 5 illustrates an example of a graphical user interface showing messages between a user and a chat bot.

FIG. 5 illustrates an example of a graphical user interface 500 showing historical messages between a user and a chat bot. GUI 500 includes an information pane 502 and a chat interface 504. The information pane 502 is presenting a set of content 506, for example, a part of an electronic medical record for a patient, an online encyclopedia entry, a web page, or a business document. The chat interface 504 includes a history sub-pane 510 for displaying a subset of historical chat messages. The chat interface 504 includes a chat window 520 for displaying chat messages for a current chat conversation 522.

The history sub-pane 510 shows a set of historical chat messages 512a, 512b, and 512c that were initiated by the user to a chatbot and a set of the chatbot's reply messages 514a, 514b, and 514c. The chatbot message 514b includes a link 516b to a chart that was shown when the messages 512b and 514b were current. When the user selects the link 516b, the system may display the chart, for example, in the topic information pane 502, or in a separate pane or window.

c. Multiple Concurrent Chat Windows

In an embodiment, a user (G) using an instance of the application can have a plurality of chat windows open in the chat interface, where each chat window corresponds to a chat conversation with a different set of participants. For example, a first chat window may correspond to a conversation between user G and user F. A second chat window may correspond to a conversation among users G, H, and K. Within a given chat window, the system may first identify a candidate set of historical stored chat messages based on the set of participants associated with the given chat window. The system then selects and displays a particular subset of the candidate set of historical chat messages based on a same set of one or more topics corresponding to content currently displayed in the information pane. Alternatively, the system may first identify a candidate set of historical stored chat messages based on a same set of one or more topics corresponding to content currently displayed in the information pane and then select and display a particular subset of the candidate set of historical chat messages based on the set of participants associated with the given chat window.

Figure 6:
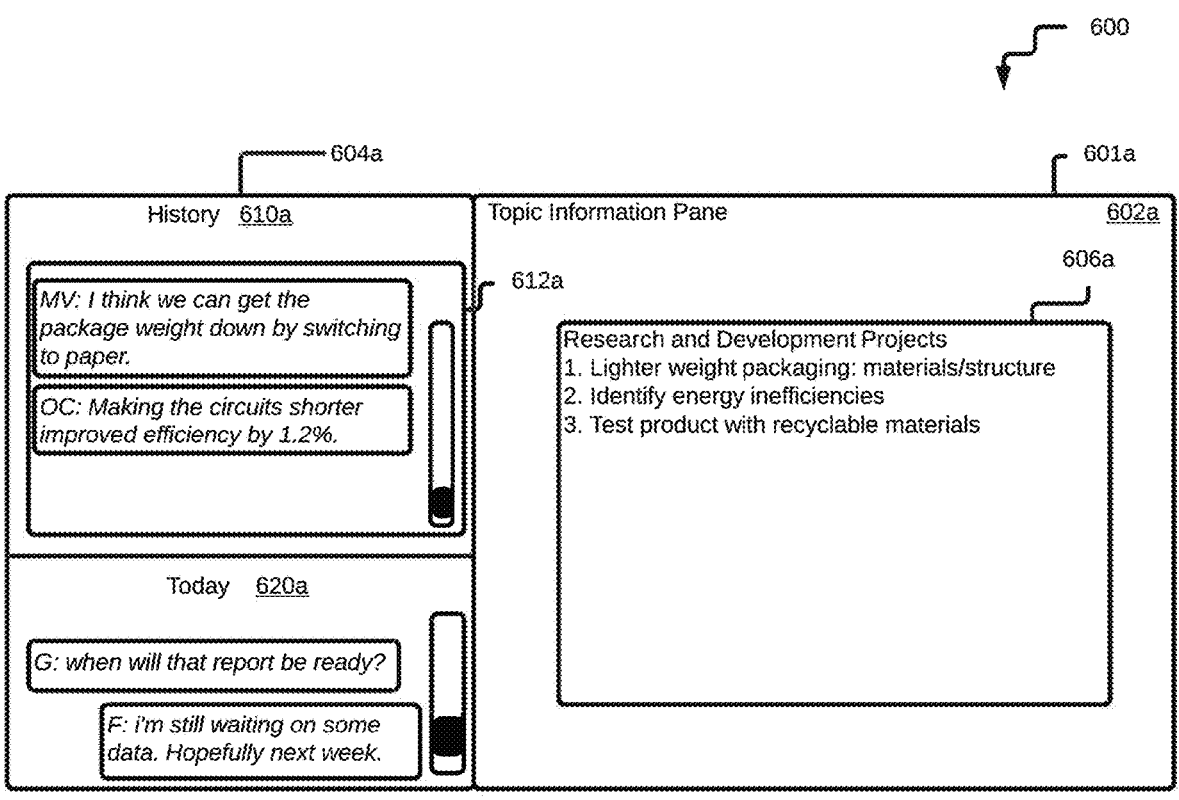
FIG. 6 illustrates an example of a graphical user interface with multiple chat interfaces.
Figure 6:
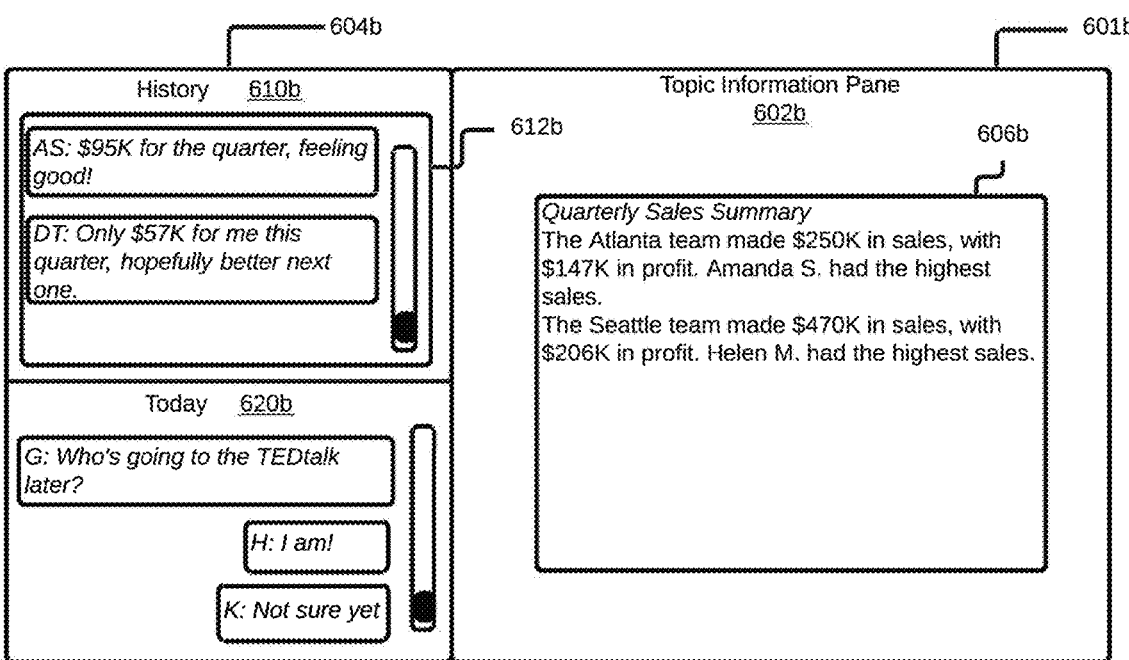

FIG. 6 illustrates an example of a graphical user interface 600 with multiple chat interfaces as shown to a user G. GUI 600 has a first chat interface 604a and a second chat interface 604b. The chat interfaces 604 may be displayed, respectively, in separate windows 601a and 601b, or in separate tabs within a window. Alternatively, the chat interfaces 604a and 604b may be displayed within a same window.

Chat interface 604a is associated with a topic information pane 602a displaying a set of content 606a. Chat interface 604b is associated with a topic information pane 602b displaying a set of content 606b.

Chat interface 604a includes a sub-pane 610a for displaying a subset of historical chat messages 610a. The chat interface 604a includes a chat window 620a for displaying chat messages for a current chat conversation between User G and User F. The subset of historical chat messages 612a is related to the one or more topics of the set of content 606a and not necessarily to topics in the current chat conversation. In an embodiment, the subset of historical chat messages 612a may also be associated with Users G and F.

Chat interface 60ba includes a sub-pane 610b for displaying a subset of historical chat messages 610b. The chat interface 604b includes a chat window 620b for displaying chat messages for a current chat conversation among User G, User H, and User K. The subset of historical chat messages 612b is related to the one or more topics of the set of content 606b and not necessarily to topics in the current chat conversation. In an embodiment, the subset of historical chat messages 612a may also be associated with Users G, H, and K.

d. Synchronizing Current and Historical Chat Messages

In an embodiment, the system continuously or periodically updates a chat interface to display subsets of historical chat messages that are related to recent chat messages. The subsets of historical chat messages may be displayed concurrently with recent chat messages within the same chat interface. The historical chat messages may correspond to conversations between a user and a chatbot or a user and other users. The system may identify a subset of the historical chat messages based on the historical chat messages corresponding to a same set of participants as a current chat conversation associated with the chat interface. The system monitors recent chat messages (e.g., within the last n minutes) to determine a first set of one or more topics corresponding to the recent chat messages. The system executes a query on a set of stored chat messages to identify a first subset of the stored chat messages associated with the first set of one or more topics. The system concurrently displays the first subset of stored chat messages in the chat interface with the recent chat messages.

Figure 7A:
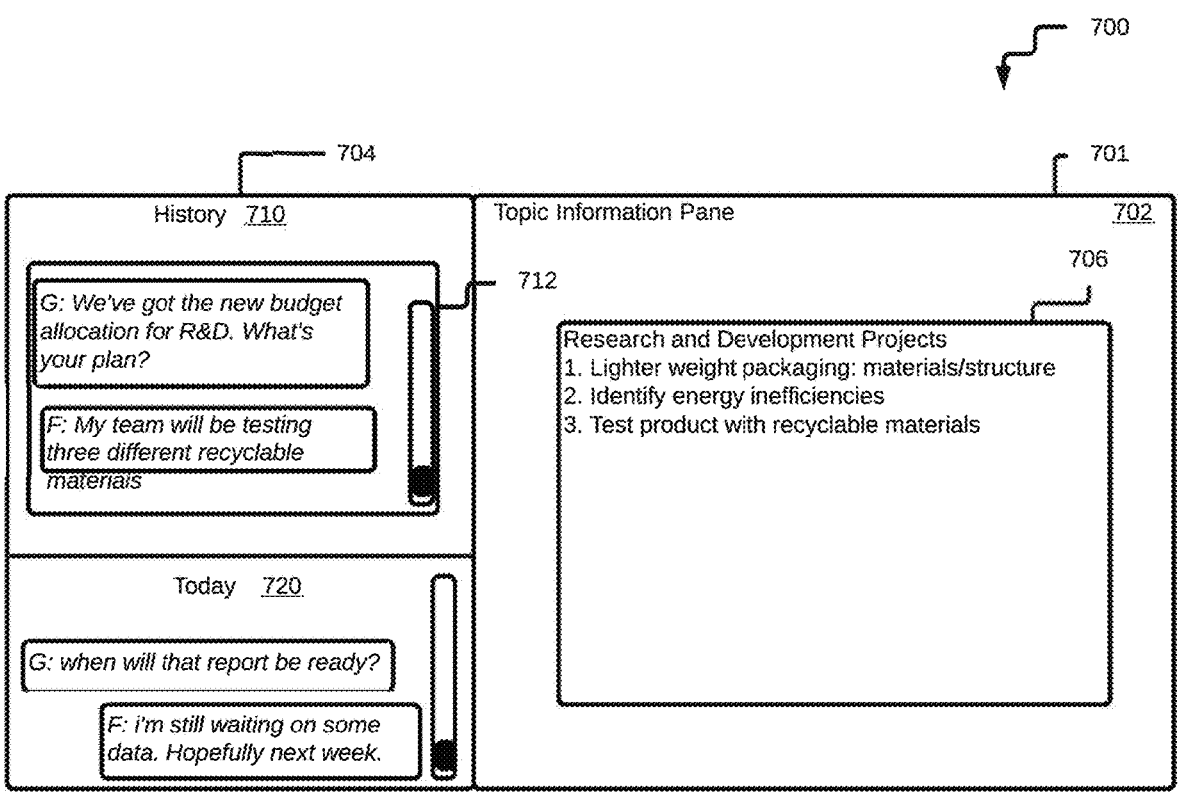
FIGS. 7A and 7B illustrate an example of a graphical user interface at two different times.
Figure 7B:
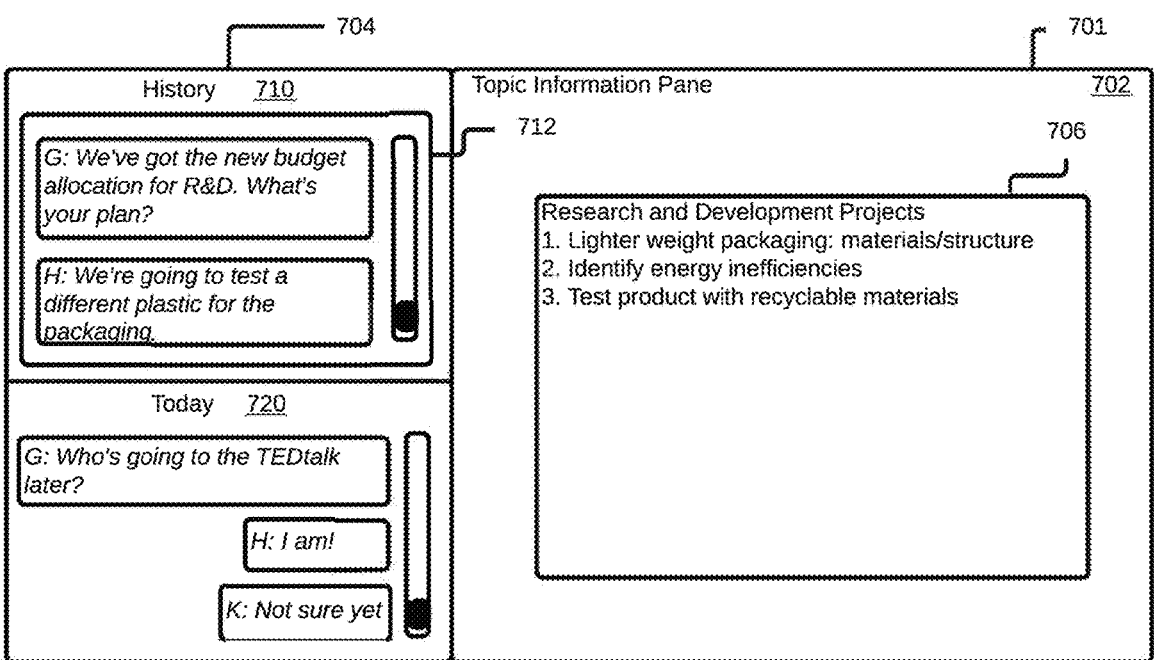

FIGS. 7A and 7B illustrate an example of a graphical user interface 700 at two different times as shown to a user G. FIG. 7A shows the GUI 700 at a first time and includes an information pane 702 and a chat interface 704. The information pane 702 is presenting a set of content 706, for example, a part of an electronic medical record for a patient, an online encyclopedia entry, a web page, or a business document. The chat interface 704 includes a sub-pane 710 for displaying a subset of historical chat messages 712. The chat interface 704 includes a chat window 720 for displaying chat messages for a current chat conversation between User G and User F. The subset of historical chat messages 712 is related to the one or more topics of the set of content 706 and to the users G and F.

FIG. 7B shows the GUI 700 at a second time. At the second time, the chat conversation in the chat window 720 is now taking place among User G, User H, and User K. Responsive to the change in the participants in the chat window, the system updates the subset of historical chat messages in the sub-pane 710 to show a second subset of historical chat messages 714. If the set of content in the topic information pane 702 changes as well, the system updates the subset of historical messages to reflect the changed content as well as the current participants in the chat conversation.

5. Practical Applications, Advantages, and Improvements

One or more embodiments provide a focused context to previous communications by synchronizing a display of historical chat messages to the topic(s) present in currently displayed information. Rather than showing an entire conversation, the system selects the relevant related messages. This allows a user to review and recollect information and communications that were received previously. This improves efficiency by relieving the user of having to search through historical chat conversations for information. The user also saves time and effort by not having to repeat previous queries or questions to other users if the user has forgotten some information. Additionally, chat conversations may include information that is not captured in other data records and can provide context or nuance to an issue related to the information being consumed from the application.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
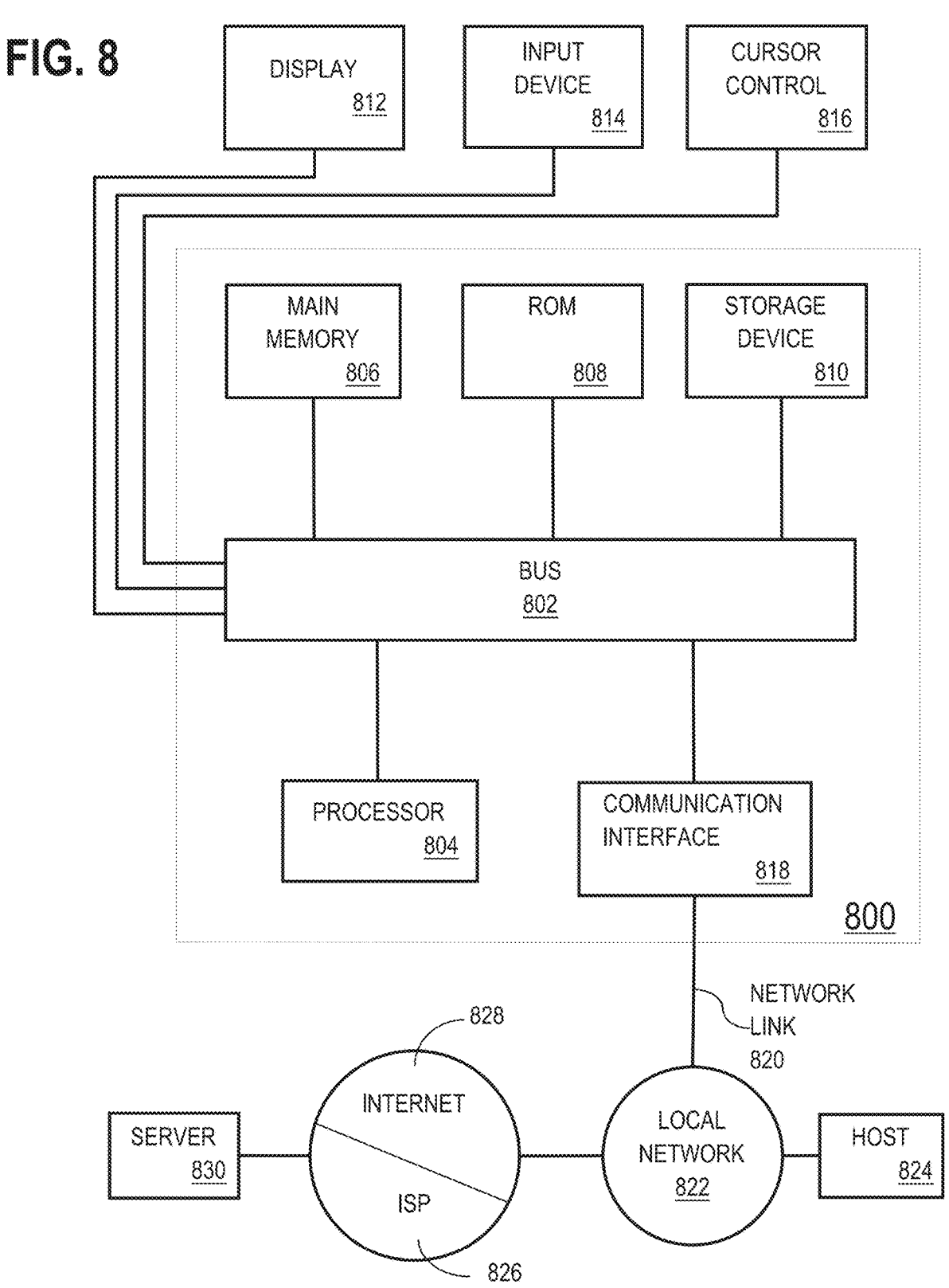
FIG. 8 shows a block diagram that illustrates a computer system in accordance with one or more embodiments.

For example, FIG. 8 is a block diagram that illustrates a computer system 800 that can be used to implement an embodiment of the disclosure. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or a Solid-State Drive (SSD) is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic that, in combination with the computer system, causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into the remote computer's dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806. Processor 804 retrieves and executes the instructions from main memory 806. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. Example forms of transmission media include the signals through the various networks, the signals on network link 820, and the signals that carry the digital data to and from computer system 800 through communication interface 818.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as the code is received, and/or stored in storage device 810, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form that such claims issue, including any subsequent correction.

What is claimed is:

1. One or more non-transitory computer readable media comprising instructions that, when executed by one or more hardware processors, cause performance of operations comprising:

concurrently displaying a chat interface and an information pane in a graphical user interface (GUI) of an application;

monitoring a first set of content currently displayed within the information pane to determine a first set of one or more topics corresponding to the first set of content;

executing a query on a set of stored chat messages to identify a first subset of the stored chat messages associated with the first set of one or more topics;

concurrently displaying the first subset of stored chat messages in the chat interface with the first set of content;

subsequent to displaying the first set of stored chat messages, detecting that the first set of content has been changed to a second set of content in the information pane;

responsive to detecting a difference between the first set of content and the second set of content, determining a second set of one or more topics corresponding to the second set of content;

executing a query on the set of stored chat messages to identify a second subset of the stored chat messages associated with the second set of one or more topics; and displaying the second subset of the stored chat messages in the chat interface concurrently with the second set of content.

2. The non-transitory media of claim 1, the operations further comprising:

identifying a set of participants communicating via the chat interface; and selecting the set of stored chat messages from a chat message database based on the set of stored chat messages involving the participants in the set of participants communicating via the chat interface.

3. The non-transitory media of claim 1, wherein a first user and a second user are communicating via the chat interface; and wherein, while the first subset of stored chat messages is displayed in the chat interface to a first user in a first instance of the application based on the first set of content being displayed within the information pane to the first user, a third subset of the stored chat messages is displayed in a second chat interface in a second instance of the application to a second user based on a third set of content being displayed in a second information pane to the second user.

4. The non-transitory media of claim 1, the operations further comprising:

displaying a third subset of stored chat messages in the chat interface concurrently with the first subset of chat messages wherein the third subset of stored chat messages correspond to chat messages created within a threshold time of a current time.

5. The non-transitory media of claim 1, the operations further comprising periodically or continuously updating chat messages shown in the chat interface based on content currently shown in the information pane.

6. The non-transitory media of claim 1, wherein the first subset of the stored chat messages displayed in the chat interface corresponds to a user's chat conversation with a chatbot and wherein the set of stored chat messages comprises a historical set of queries by the user and responses by the chatbot.

7. The non-transitory media of claim 1, the operations further comprising:

displaying a plurality of chat windows within a chat interface; and for each particular chat window, of the plurality of chat windows:

identifying a candidate set of historical chat messages based on a set of participants associated with the particular chat window; and within each particular chat window, displaying a particular subset of the respective candidate set of chat messages based on a same set of one or more topics corresponding to content currently displayed in the information pane.

8. The non-transitory media of claim 1, the operations further comprising:

receiving a configuration for information to be displayed in the information pane, wherein the configuration a) identifies the first set of content in the information for use in selecting subsets of the stored chat messages and b) identifies a third set of content in the information that is not to be used in selecting subsets of the stored chat messages;

wherein, based on the configuration, the first set of one or more topics is determined based on the first set of content and not determined based on the third set of content.

9. A method comprising:

concurrently displaying a chat interface and an information pane in a graphical user interface (GUI) of an application;

monitoring a first set of content currently displayed within the information pane to determine a first set of one or more topics corresponding to the first set of content;

executing a query on a set of stored chat messages to identify a first subset of the stored chat messages associated with the first set of one or more topics;

displaying the first subset of stored chat messages in the chat interface concurrently with the first set of content;

subsequent to displaying the first set of stored chat messages, detecting that the first set of content has been changed to a second set of content in the information pane;

responsive to detecting a difference between the first set of content and the second set of content, determining a second set of one or more topics corresponding to the second set of content;

executing a query on the set of stored chat messages to identify a second subset of the stored chat messages associated with the second set of one or more topics; and displaying the second subset of the stored chat messages in the chat interface concurrently with the second set of content;

wherein the method is performed by at least one device including a hardware processor.

10. The method of claim 9, further comprising:

identifying a set of participants communicating via the chat interface; and selecting the set of stored chat messages from a chat message database based on the set of stored chat messages involving the participants in the set of participants communicating via the chat interface.

11. The method of claim 9, wherein a first user and a second user are communicating via the chat interface; and wherein, while the first subset of stored chat messages is displayed in the chat interface to a first user in a first instance of the application based on the first set of content being displayed within the information pane to the first user, a third subset of the stored chat messages is displayed in a second chat interface in a second instance of the application to a second user based on a third set of content being displayed in a second information pane to the second user.

12. The method of claim 9, further comprising:

displaying a third subset of stored chat messages in the chat interface concurrently with the first subset of chat messages wherein the third subset of stored chat messages correspond to chat messages created within a threshold time of a current time.

13. The method of claim 9, further comprising periodically or continuously updating chat messages shown in the chat interface based on content currently shown in the information pane.

14. The method of claim 9, wherein the chat interface corresponds to a user's chat conversation with a chatbot and wherein the set of stored chat messages comprises a historical set of queries by the user and responses by the chatbot.

15. The method of claim 9, further comprising:

displaying a plurality of chat windows within a chat interface; and for each particular chat window, of the plurality of chat windows:

identifying a candidate set of historical chat messages based on a set of participants associated with the particular chat window; and within each particular chat window, displaying a particular subset of the respective candidate set of chat messages based on a same set of one or more topics corresponding to content currently displayed in the information pane.

16. The method of claim 9, further comprising:

receiving a configuration for information to be displayed in the information pane, wherein the configuration a) identifies the first set of content in the information for use in selecting subsets of the stored chat messages and b) identifies a third set of content in the information that is not to be used in selecting subsets of the stored chat messages;

wherein, based on the configuration, the first set of one or more topics is determined based on the first set of content and not determined based on the third set of content.

17. A system comprising:

one or more hardware processors;

program instructions stored on the one or more non-transitory computer-readable media that, when executed by the one or more hardware processors, cause the system to perform operations comprising:

concurrently displaying a chat interface and an information pane in a graphical user interface (GUI) of an application;

monitoring a first set of content currently displayed within the information pane to determine a first set of one or more topics corresponding to the first set of content;

executing a query on a set of stored chat messages to identify a first subset of the stored chat messages associated with the first set of one or more topics;

displaying the first subset of stored chat messages in the chat interface concurrently with the first set of content;

subsequent to displaying the first set of stored chat messages, detecting that the first set of content has been changed to a second set of content in the information pane;

responsive to detecting a difference between the first set of content and the second set of content, determining a second set of one or more topics corresponding to the second set of content;

executing a query on the set of stored chat messages to identify a second subset of the stored chat messages associated with the second set of one or more topics; and displaying the second subset of the stored chat messages in the chat interface concurrently with the second set of content.

18. The system of claim 17, the operations further comprising:

identifying a set of participants communicating via the chat interface; and selecting the set of stored chat messages from a chat message database based on the set of stored chat messages involving the participants in the set of participants communicating via the chat interface.

19. The system of claim 17, wherein a first user and a second user are communicating via the chat interface; and wherein, while the first subset of stored chat messages is displayed in the chat interface to a first user in a first instance of the application based on the first set of content being displayed within the information pane to the first user, a third subset of the stored chat messages is displayed in a second chat interface in a second instance of the application to a second user based on a third set of content being displayed in a second information pane to the second user.

20. The system of claim 17, the operations further comprising displaying a third subset of stored chat messages in the chat interface concurrently with the first subset of chat messages wherein the third subset of stored chat messages correspond to chat messages created within a threshold time of a current time.

*    *    *    *    *